United States Patent Office 3,332,280
Patented July 25, 1967

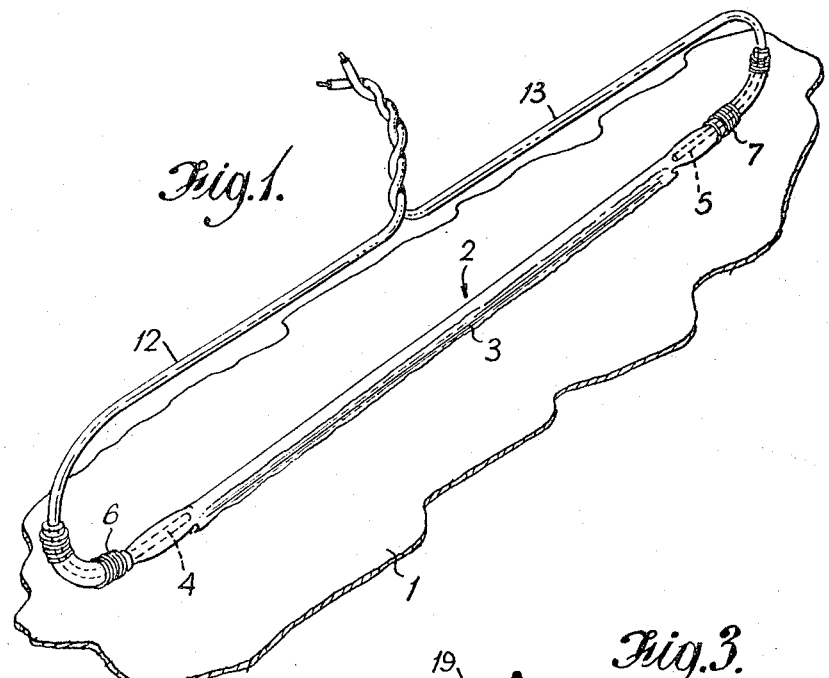
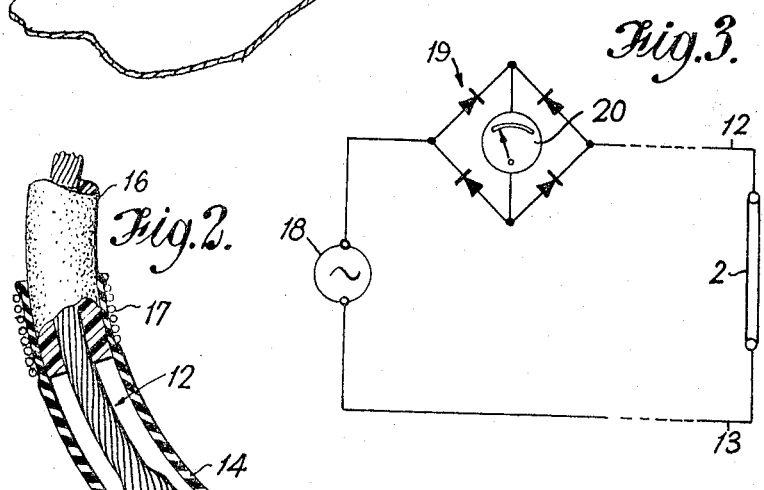
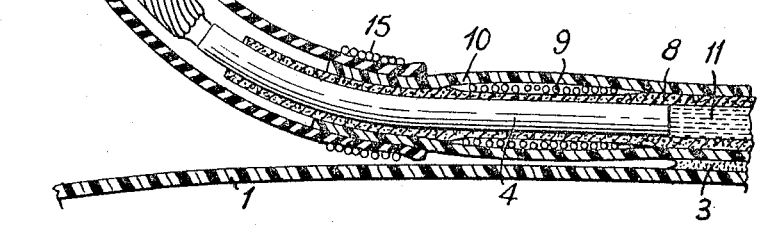

3,332,280
STRAIN GAUGE FOR LARGE EXTENSIONS
Daniel Cecil Edward Fish, Lymington, and Robert Brien Campbell, Swanage, Dorset, England, assignors to Dracone Developments Limited, London, England, a British company
Filed Mar. 26, 1965, Ser. No. 443,130
Claims priority, application Great Britain, Apr. 10, 1964, 15,031/64
11 Claims. (Cl. 73—88.5)

This invention relates to strain gauges.

It is difficult to measure strain in materials which are elastic because strain gauges of conventional type are not well adapted to the measurement of large extensions.

According to the invention a strain gauge comprises a tube of an elastomer material, a conductive electrode sealed into each end of the tube and a filling for the tube consisting of an electrolyte.

It is a feature of the problem to be solved that extension should be measured over a fairly considerable length of the elastic material to average out purely localised effects.

According to a further aspect of the invention the elastomer tube has a length many times larger than the diameter of the bore.

The nature of the invention will be more readily apparent from the following description of a preferred embodiment thereof, illustrated in the accompanying drawings in which:

FIG. 1 is a perspective sketch of the said embodiment when installed, and,

FIG. 2 is a longitudinal section of one end of the said embodiment, drawn to an enlarged scale.

FIG. 3 shows a suitable circuit for A.C. excitation of the strain gauge.

FIG. 1 shows a sheet of elastic material 1 the strains in which are to be measured. An elastomer tube, generally indicated as 2, is stuck down to the surface of sheet 1 by an elastomer adhesive 3. Copper wires or rods 4 and 5 are inserted into the ends of the tube 1 and secured as by binding at 6 and 7.

The elastomer tube has a length of about 10 inches and its internal diameter is about 0.06 inch. The choice of material for the tube is governed by the following considerations namely:

(a) It must be sufficiently elastic to add a negligible amount to the stiffness of the material whose strains are to be gauged.

(b) It must be resistant to attack by the electrolyte, and, (c) It must be impermeable to the electrolyte.

The electrolyte used in this embodiment of the invention is copper sulphate, preferably of normal laboratory purity, and the electrodes are copper wires.

Normal rubber latex tube is attacked by copper sulphate, the copper acting as a catalyst of certain reactions which destroy the rubber. A convenient material resistant to this attack is silicone rubber but this tends to be permeable so that electrolyte is lost. The effect of this permeability can be circumvented by soaking the silicone rubber tube in distilled water until the water saturates it and then pulling the silicone rubber tube through a slightly larger closely fitting tube of natural rubber latex. FIGURE 2 shows one end of the strain gauge sectioned, the inner silicone rubber tube 8 being secured to copper electrode 4 by binding 9 which all fits within the outer natural rubber latex tube 10. This natural rubber outer tube 10 prevents leakage from the inner silicone rubber tube 8 and the distilled water saturating the inner tube restricts the penetration to the outer tube of the electrolyte 11.

The preferred composition of the electrolyte is:

20% by weight CuSO
Between 1½% and 8% by weight $H_2SO_4$
Distilled water to 100%

Sulphuric acid improves the conductivity and reduces the likelihood of gas bubbles forming.

The copper wire or rod electrodes 4 and 5 are flattened at their outer ends and lead out wires 12 and 13 are soldered to them. FIG. 2 shows lead-out wire 12 soldered to electrode 4, the whole being covered by a glove 14 of natural rubber latex, fitting at one end over the outer tube 10 and secured thereto by binding 15, and at the other end fitting over the insulation 16 of the lead-out wire 12, and secured thereto by binding 17.

The basic chemical reaction which takes place when copper sulphate and sulphuric acid are dissolved in water may be written in the following manner:

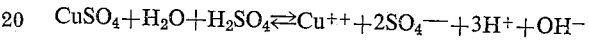

$$CuSO_4 + H_2O + H_2SO_4 \rightleftharpoons Cu^{++} + 2SO_4^{--} + 3H^+ + OH^-$$

When a potential is applied across the two copper electrodes copper dissolves away from the positive anode to form $Cu^{++}$ ions whilst $Cu^{++}$ ions in solution are deposited on the negative cathode to form metallic copper, so that the concentration of copper ions remains constant. As the copper ions carry double positive charge they are moved preferentially to the $H^+$ and $OH^-$ ions. The $SO_4$ ions may be considered as being deposited on the positive anode and forming $CuSO_4$ which is immediately redissolved. The electrolyte therefore remains of constant composition and no gas is released.

The electrical characteristics of the gauge remain reasonably constant so long as the current passed is small enough to avoid the build-up of a concentration of $CuSO_4$ in the region of the anode. Periodic reversal of the applied polarity also improves the performance of the gauge in this respect.

The gauge in tthe form of the illustrated embodiment has a resistance of the order of 25,000 ohms.

Conveniently a voltage of the order of one volt or less is applied to the gauge with a sensitive galvanometer in series with one lead. The galvanometer is preferably a recording galvanometer. Currents of the order of 40 microamps are passed, and the range of variation involved in the measurement of strains in one use to which the strain gauge has been put, namely the measurements of skin strains in a flexible barge made of rubber coated nylon fabric, filled with fluid less dense than water, and floating in water, were of the order of ±4 microamps, when the barge was towed in waves. With an appropriately increased supply voltage, maximum currents of the order of 100 microamps may be passed through the strain gauge but larger currents tend in time to give rise to gassing.

The use of alternating current excitation enables higher currents to be passed without deterioration of the strain gauge. The frequency should be chosen so that it is significantly higher than the recurrence frequency of the strains to be measured but low enough to avoid distortion of readings due to reactance effects from the gauge itself or its connecting leads.

Alternating currents at 50 c.p.s. having a voltage of the order of 10 volts R.M.S. has been successfully used for measurements of skin strains in flexible barges as mentioned above. Currents of the order of 400 microamps R.M.S. were passed, the fluctuations being of the order of ±40 microamps. This represents an elongation of the gauge of the order of ±5%. The measuring circuit in its simplest form consists of an instrument type rectifier and a galvanometer which is able of itself to smooth out residual ripples in the rectified currents.

FIG. 3 shows a suitable circuit for A.C. excitation of the strain gauge. A source 18 of alternating current is connected by one pole to a full wave bridge rectifier 19 the diagonally opposite point of which is connected to one of the leads say lead 12 of the strain gauge indicated as 2. The other pole of the source 18 is connected to the other lead—say lead 13—of the strain gauge the intermediate diagonal points of the rectifier are respectively connected to the two terminals of a galvanometer 20.

Gauges according to the invention have the advantage of being insensitive to quite high accelerations and being unaffected by bending short of a kink which interrupts the conductive path through the electrolyte. When such a kink occurs there is a sharp transition between normal current and complete open circuit so that there can be no risk of faulty results on that account. Furthermore the gauge responds instantaneously to extensions and contractions.

By way of explanation of the functioning of the gauge it is pointed out that an extension of the gauge raises its resistance by lengthening the resistive path and at the same time reducing its cross sectional area whereby the resistance per unit length is increased. R, the resistance, is proportional to $$\frac{L \text{(length)}}{A \text{(cross sectional area)}}$$

Since the volume V is constant, and equal to $L \times A$, $$A = \frac{V}{L}$$

and therefore R is proportional to $L^2$. In practice, for reasons not fully understood the power of L is somewhat less than 2. In the case of the embodiment described it is 1.85.

Other materials could be used for the tube and, according to the electrolyte used, it may be possible to obtain a material which is both impermeable and resistant to attack by the electrolyte, so that the use of inner and outer tubes may be obviated. Where the electrolyte is copper sulphate however the choice of materials is limited, though certain formulations of polyether resin could be used.

The use of two tubes, one within the other has certain advantages however in that it enables a gauge to be renewed without disturbing the attachment to the surface whose strains are to be gauged. The end clamps or bindings are removed, the old inner tube and electrodes drawn out, a new inner tube/electrode assembly drawn into the outer tube and the ends re-clamped or re-bound.

Other metallic salt solutions and electrode metals, giving rise to similar reactions to those described above, may be used in place of the electrolyte and electrodes, used in the preferred embodiment. Nevertheless copper sulphate, with copper electrodes, is believed to be the most convenient in that it has a conveniently low specific resistance and is cheap.

We claim:

1. A strain gauge comprising a tube of an elastomer material, a conductive electrode sealed into each end of the tube, a filling for the tube consisting of an electrolyte including a solvent liquid, said tube comprising an inner tubular layer of an elastomer material which is resistant to attack by and is substantially impervious to the electrolyte, and an outer tubular layer of an elastomer material which is highly impervious to liquids and may be resistant to attack by the electrolyte, the inner tubular layer being saturated with the solvent liquid of the electrolye, the two tubular layers being sealed to one another at their ends whereby the escape of electrolyte is hindered and whereby the outer tubular layer is protected from attack by the electrolyte.

2. The strain gauge as claimed in claim 1 in which any space between the inner and the outer tubular layers is filled with the said solvent liquid.

3. The strain gauge as claimed in claim 1 in which at least one of the electrodes is of copper and in which the electrolyte comprises an aqueous solution of copper sulphate, the liquid with which the inner tubular layer is saturated being water.

4. The strain gauge as claimed in claim 3 in which the elastomer material of the inner tubular layer is a silicone rubber of a grade which is resistant to attack by copper sulphate and the elastomer material of the outer tubular layer is natural rubber latex.

5. The strain gauge as claimed in claim 3 in which the electrolyte also contains sulphuric acid.

6. The strain gauge as claimed in claim 3 in which the electrolyte contains 20% by weight of copper sulphate, between 1½% and 8% by weight of sulphuric acid, the remainder being distilled water.

7. The strain gauge as claimed in claim 3 in which both electrodes are of copper.

8. The strain gauge as claimed in claim 1 in which the length of the column of electrolyte between the two electrodes is between 120 and 200 times the diameter of the internal bore of the tube.

9. The strain gauge as claimed in claim 8 in which the diameter of the internal bore of the tube is approximately .06 inch.

10. The combination comprising a strain gauge as claimed in claim 1, a source of alternating current, a rectifier, connections from the source to the strain gauge and the rectifier, whereby current from the source passes through the strain gauge and the rectifier and means for measuring the current rectified by the rectifier.

11. The combination according to claim 10 in which the voltage of the source is approximately 10 volts R.M.S. and the resistance of the strain gauge when not extended is approximately 25,000 ohms.

References Cited

UNITED STATES PATENTS

| | | | |
|---|---|---|---|
| 2,518,906 | 8/1950 | Kocmich | 73—88.5 |
| 2,600,029 | 6/1952 | Stone | 73—88.5 |
| 2,739,212 | 3/1956 | Woolley et al. | 338—83 |

FOREIGN PATENTS 70,025  12/1892  Germany.

OTHER REFERENCES

Stout, M. B., Basic Electrical Measurements. New York, Prentice-Hall, Inc., 1950, p. 430.

RICHARD C. QUEISSER, *Primary Examiner.*

J. H. WILLIAMSON, *Assistant Examiner.*